Figure 1:
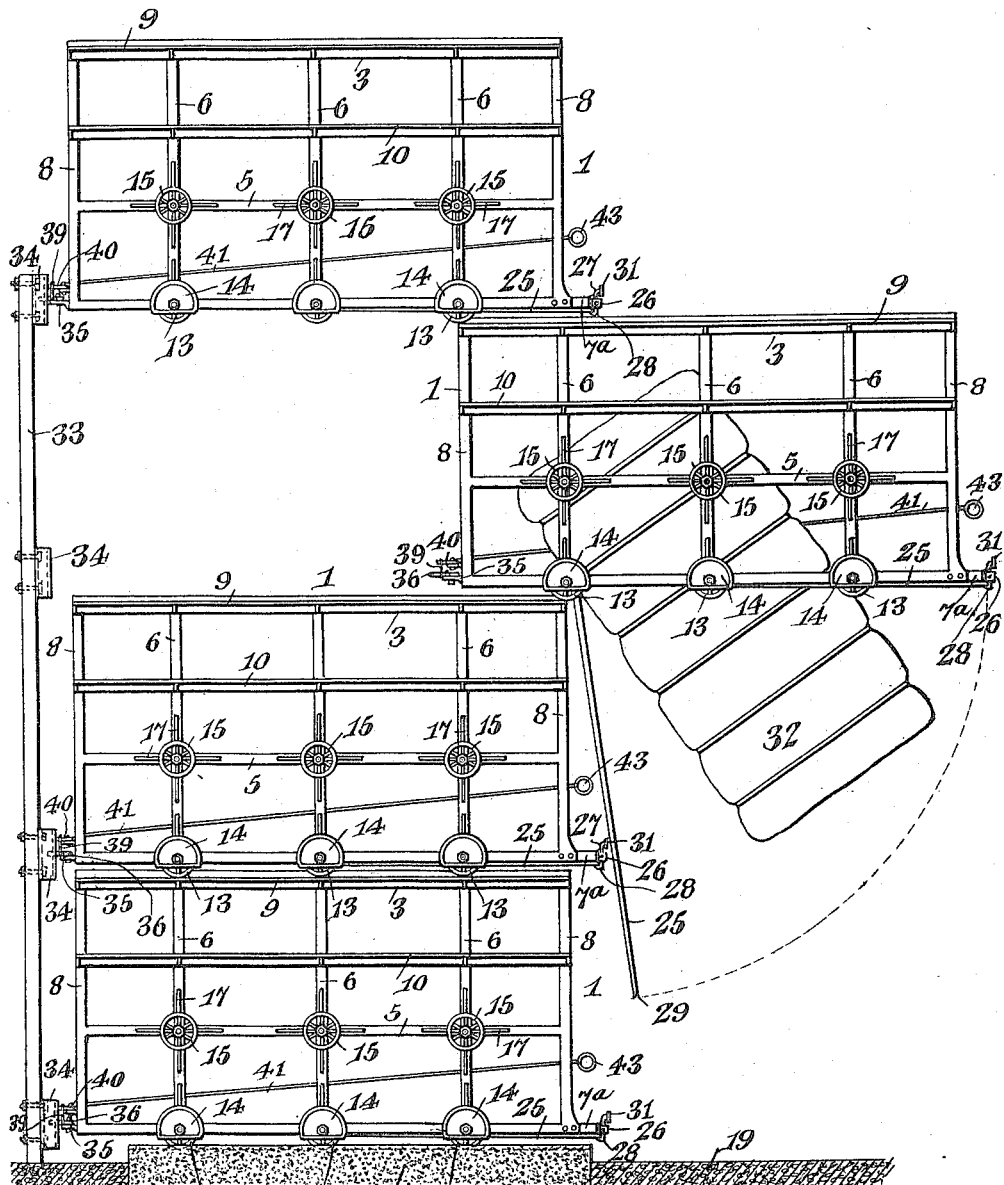

A. L. GREHAN.
MEANS FOR STORING BALED COTTON OR OTHER COMMODITIES.
APPLICATION FILED FEB. 24, 1915.

1,202,706.

Patented Oct. 24, 1916.
3 SHEETS—SHEET 1.

WITNESSES
Jas. F. McCathran
F. T. Chapman

Arthur L. Grehan, INVENTOR
BY
ATTORNEY

A. L. GREHAN.
MEANS FOR STORING BALED COTTON OR OTHER COMMODITIES.
APPLICATION FILED FEB. 24, 1915.

1,202,706.

Patented Oct. 24, 1916.
3 SHEETS—SHEET 2.

WITNESSES
Jas. K. McCathran
F. T. Chapman

Arthur L. Grehan, INVENTOR
BY E. G. Siggers
ATTORNEY

A. L. GREHAN.
MEANS FOR STORING BALED COTTON OR OTHER COMMODITIES.
APPLICATION FILED FEB. 24, 1915.
1,202,706.
Patented Oct. 24, 1916.
3 SHEETS—SHEET 3.
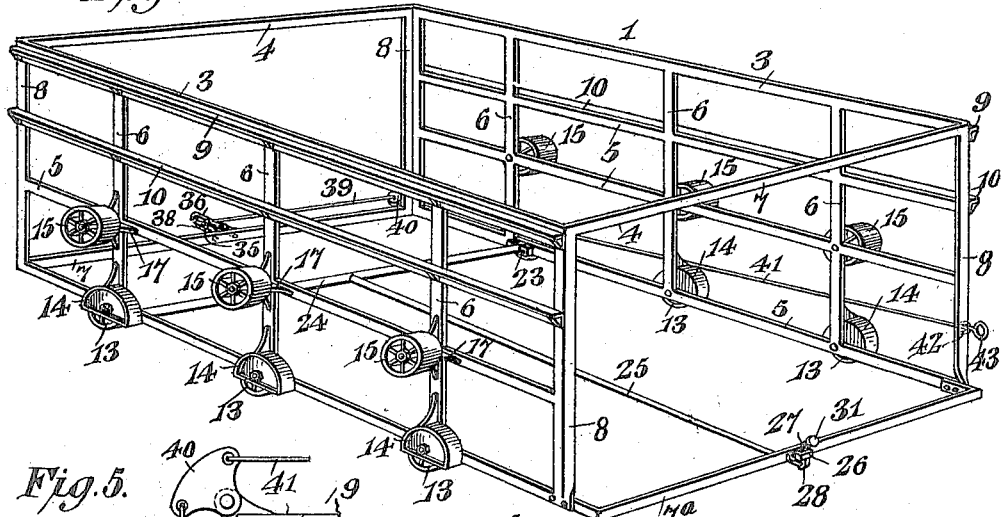
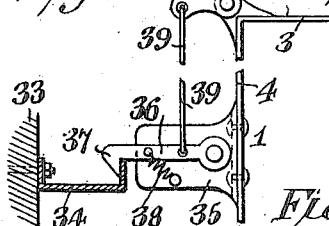
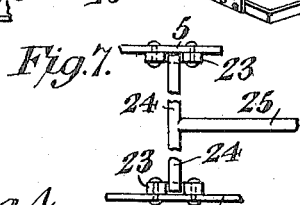
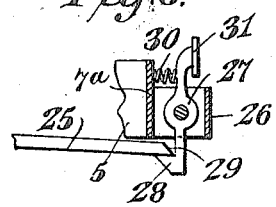
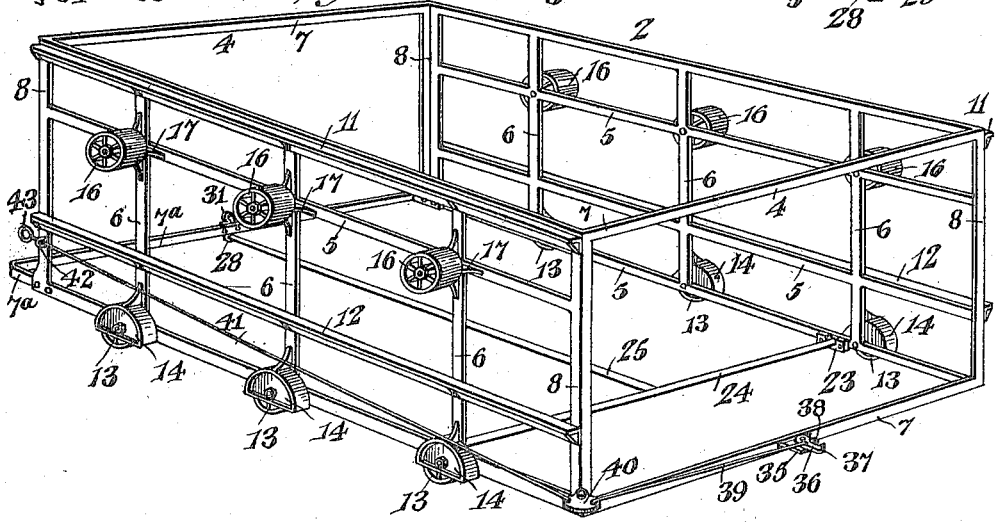
WITNESSES
Jas. K. McCathran
F. P. Chapman
Arthur L. Grehan, INVENTOR
BY E. G. Siggers
ATTORNEY

UNITED STATES PATENT OFFICE.

ARTHUR LEE GREHAN, OF MEMPHIS, TENNESSEE.

MEANS FOR STORING BALED COTTON OR OTHER COMMODITIES.

1,202,706.  Specification of Letters Patent.  Patented Oct. 24, 1916.

Application filed February 24, 1915. Serial No. 10,334.

*To all whom it may concern:*

Be it known that I, ARTHUR L. GREHAN, a citizen of the United States, residing at Memphis, in the county of Shelby and State of Tennessee, have invented a new and useful Means for Storing Baled Cotton or other Commodities, of which the following is a specification.

This invention has reference to means for storing baled cotton, and while particularly designed for the purpose of facilitating the storage of and access to bales of cotton in warehouses or other storage places, the invention has an extent of use in connection with other commodities where storage and ready access is of moment.

For convenience of description the commodity to be stored will be considered as baled cotton without, however limiting the invention to any such specific commodity, although the invention is particularly useful in connection with the storing of baled cotton.

It is the object of the present invention to provide means whereby the bales are provided with holding devices individual thereto, and these holding devices are so constructed and associated that any holding device with its contained bale is at all times readily accessible without in any manner disturbing any of the other holding devices and their contained bales.

In accordance with the present invention each bale has a cage or container individual thereto, and the cages are provided with interconnecting and intersupporting means whereby the cages may be piled in tiers of a suitable height and the tiers arranged in long rows, while any cage may be withdrawn from its stored position to a position whereby the bale is readily accessible for removal, or the cage is readily accessible for placing a bale in it. By the construction of the present invention the lower cages support higher cages, but this does not interfere with the withdrawal of any of the cages from association with those already in place, since the support for higher cages afforded by the withdrawn cage is immediately assumed by the neighboring cages, wherefore the row of tiers of cages remains at all times intact.

By means of the present invention a large number of bales, which in some instances may reach many thousands, may be stored in a warehouse and by a suitable system of identification any desired bale may be quickly located by reference to a suitable index or book and then found in the shortest possible time and with a minimum of trouble.

The invention will be best understood from a consideration of the following detailed description, taken in connection with the accompanying drawings forming a part of this specification, with the further understanding that while the drawings show a practical form of the invention, the latter is not confined to any strict conformity with the showing of the drawings, but may be changed and modified so long as such changes and modifications mark no material departure from the salient features of the invention.

Figure 2:
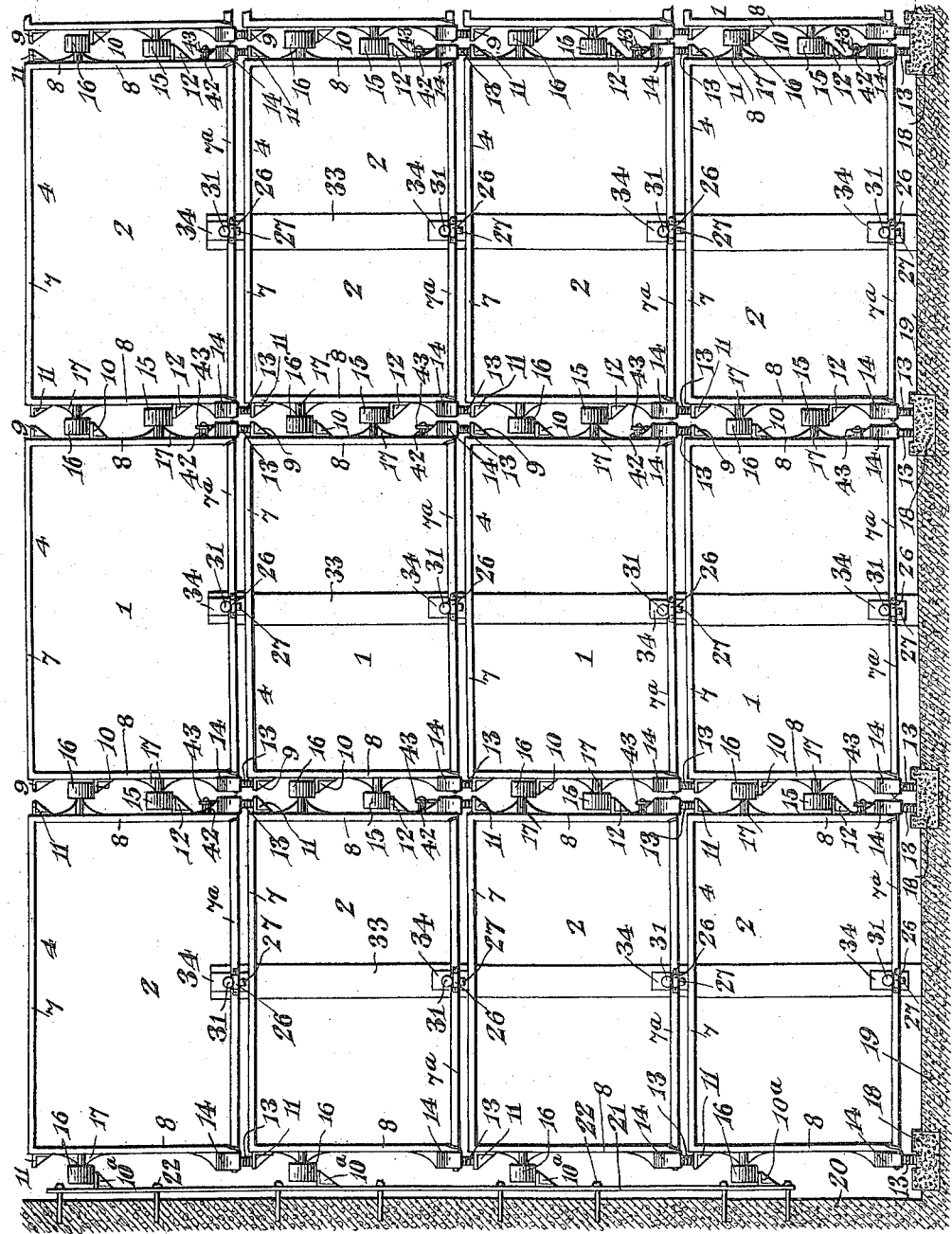

In the drawings:—Figure 1 is an end elevation of a single tier of cages with one of the higher cages drawn out, and the bale falling therefrom, the bales being omitted from the other cages and more distant cages being also omitted for simplicity of illustration. Fig. 2 is a front elevation of a portion of a row of tiers of cages, the bales of cotton being omitted to avoid hiding distant parts. Fig. 3 is a perspective view of one of the cages as seen from the front. Fig. 4 is a perspective view of one of the cages as seen from the rear. Fig. 5 is a detail view with parts omitted, broken away and in section, of a holding latch for one of the cages. Fig. 6 is a detail view with parts broken away and other parts in section of a latch for holding a bale supporting member in place. Fig. 7 is a fragmentary view with parts broken away of a pivot structure for the bale supporting member.

The storage structure comprises cages 1 and 2, shown respectively in Figs. 3 and 4 to best advantage, and also appearing in Figs. 1 and 2. In general structure all the cages are alike, and comprise skeleton sides 3 and open frame-like ends 4. Since a bale of cotton is generally in the form of a rectangular solid the cages 1 and 2 are of rectangular form with the tops wholly open and the bottoms partly closed, as will hereinafter appear. The sides of each cage are made up of longitudinal members 5 and uprights 6 either in the form of a casting or made of structural steel or in any suitable way providing sufficient strength and rigidity. The ends 4 may comprise top and bottom bars 7 with end uprights 8 coalescing with the uprights 6.

Extending lengthwise of the sides of each cage 1 close to the top and above the middle line are longitudinal tracks 9, 10, respectively, setting out from the sides 3 of the cage. Each cage 2 has a longitudinal top track 11 thereon and a lower track 12 below the middle line of the cage. The tracks 10 and 12 may be located at about equal distances above and below the mid line of the height of the cage, respectively. Each cage has fast to the lowermost bars of its sides rollers or wheels 13 preferably each partly covered by a hood 14, although this particular structure is not obligatory. Each cage 1 has on each side a longitudinal row of rollers 15 elongated axially to a greater extent than the rollers 13, and each cage 2 has similar sets of rollers 16 similarly elongated axially. While the number of rollers arranged lengthwise of the cages may be varied within considerable limits, three rollers in each lengthwise series is found to be sufficient.

The rollers 13 with their hoods 14 are arranged quite close to the sides 3 and project therefrom only a distance about equal to the projection of the tracks 9 and 10 or 11 and 12, as the case may be. The rollers 15 and 16 extend axially to a greater degree than the rollers 13 and may be offset from the respective cages by brackets 17 or in any other manner. The rollers 15 and 16 with the supporting brackets 17 extend sufficiently from the corresponding sides of the respective cages and are suitably located to run upon the tracks 10 or 12, as the case may be, of the adjacent cages. The rollers 13 either engage the tracks 9 or 11, as the case may be, or run upon basic tracks 18 upon the floor 19 of the warehouse, or other building in which the structure is installed.

While there are two general styles of cage employed, those cages which are arranged adjacent to the end walls 20 of the storehouse do not require either the tracks 10 or 12. In this instance the cages 2 are used, and as the tracks 12 are not needed they are omitted. On the end wall 20 of the storage compartment or house tracks 10ª are arranged and may be carried by suitable uprights 21 made fast to the end wall 20 by anchor bolts 22 or otherwise. Each cage 1 and 2 has one end constituting the front end and the other the rear end. The bottom member of the front end 4 of each cage projects forwardly to a greater extent than the top member of the same end, and this forwardly projecting bottom member is shown at 7ª.

Fast to the bottom longitudinal bars or strips of the sides of each cage near the rear end are socket blocks 23 receiving the ends of a bar 24 extending across the bottom portion of the cage. Midway of the bar 24 there is fast thereto one end of another bar 25 extending lengthwise of the cage to the projected lower front bar 7ª of the front of the cage, and for a short distance beyond this front bar. Fast to the front bar 7ª about midway of its length is an outstanding strap 26 in which is pivoted a latch lever 27 having a beveled nose 28 in position to engage under and support the corresponding end of the bar 25, which end is beveled as shown at 29 so as to readily snap into engagement with the latch lever 27. A spring 30 holds the latch lever yieldably in the locking position and a push piece 31 at the end of the lever remote from the nose 28 forms a convenient means for manipulating the latch lever.

So long as the latch lever 27 remains with its nose 28 in underriding relation to the beveled end 29 of the bar 25 said bar 25 serves as an upholding member or bottom for the cage, and a bale of cotton, such as indicated at 32 in Fig. 1, if lodged within the cage is therein retained by the bars 24 and 25, but the support afforded by the bar 24 is near one end of the bale and remote from the latch lever 27.

If the cage with the bale in it be supported so that that portion of the under side of the cage in front of the bar 24 is free from under obstruction, a manipulation of the latch lever 27 will cause the release of the bar 25 and the preponderance of weight of the bale being then upon the bar 25 in front of the bar 24, that end of the bale then constituting the front end will fall, the bar 25 also falling because it readily rocks with the bar 24 upon the pivot blocks 23. Since the only support for the bale is then the bar 24 located well toward the rear end of the bale, such bale will rock on the bar with the front end of the bale falling. Since the bale is of generally rectangular shape its upper front edge will describe a forward arc about the bar 24 as a center. This upper front edge therefore may move beyond the upright plane of the front of the cage, wherefore there is provided the front extension 7ª, thus making allowance for the front arc of movement of the upper front edge of the bale. The cages are piled in tiers usually four high, but, of course, a less or a greater number of cages may be provided for each tier.

In assembling the cages in the storage compartment provided for them, a tier of cages 2 is arranged close to the side wall 20 with the rollers or wheels 13 upon adjacent tracks 18 and the rollers 16 engage the tracks 10ª, which latter are fast to the end walls 20. The next tier of cages is made up of cages 1 with the rollers 13 upon second and third tracks 18 in order. In this case the rollers 15 of the cages 1 ride upon the tracks 12 of the cages 2, and the rollers 16 of the cages 2 engage upon the tracks 10 of the cages 1, so that the rollers and tracks alternate from the bottom to the top of the tier. The next tier is composed of cages 2 and the following tier is composed of cages 1, and so on throughout the length of the warehouse.

In order to hold the cages constituting the tiers against any chance of accidental displacement each tier has at its rear an upright 33 to which is secured short channel strips 34 at appropriate heights constituting stop members for bumper strips or blocks 35 on the rear lower end strips 7 of the respective cages. These bumper strips 35 each carry a latch arm 36 having one end pivoted to the bumper strip and the other end formed into a latch nose 37 adapted to engage one web of the respective channel 34. A spring 38 constrains the arm 36 to the latching position. Each arm 36 is connected to one end of a link 39 which at the other end is connected to a bell crank lever 40. Leading from the bell crank lever 40 is a reach rod 41 continued to the front end of the cage where it is slidably supported in an eye 42 and terminates in a handhold 43 within easy reach of an operator.

While usually the tiers of cages are arranged four high, but may contain more cages or a lesser number of cages, the number of tiers which may be assembled together lengthwise need not be limited except by the length of the warehouse. Of course, it will be understood that with a sufficient floor space any desirable number of rows of tiers may be arranged so long as sufficient space be provided for pulling out the cages from the locked position.

In Fig. 1 one of the cages, namely, the third from the bottom, is shown drawn out, but is prevented from tipping by the support afforded by the neighboring cages where engaged by the rollers 13 and 15 of the drawn out cage and the forward rollers 13 of the higher cage, together with the corresponding rollers 16 of the cages of each side. In the particular illustration in Fig. 1 the withdrawn cage is supported near the rear end by the front ends of all the neighboring cages and the weights of these cages with the bales of cotton contained in them is ample to hold the withdrawn cage in such position. Now, on releasing the rod or bar 25 supporting the bale within the withdrawn cage the bar gravitates to a pendent position and the bale being no longer supported falls from the cage and may be caught on any appropriate vehicle or may be allowed to drop to the floor to be handled as desired. The bales in the lower cages may simply be lifted therefrom since there is no room to allow them to drop, but those in the upper cages are allowed to drop to a lower level when it is desired to remove them from their cages. The movement of the cages into and out of position may be rendered easy by mounting all of the wheels or rollers upon ball bearings. Any cage may be identified by suitable indicia, so that by a proper system any particular bale is readily found.

As cotton bales are usually stored it is customary to pile them in layers or rows of five, and in every group there is any amount from twenty to one hundred bales. When any particular bale is wanted those on top of it and at the sides above it have to be moved. This means a great amount of labor and much loss of time. With the present invention any particular bale wanted is located at once and is reached without moving or in any way disturbing any other bale. By the ordinary way of locating bales each bale has to be looked at until the one wanted is found. If, for instance, five or six hundred bales are wanted in ten to twenty different places among fifteen to eighteen thousand bales, it means expenditure of a large amount of time.

With the present invention each group of cages or cradles may be lettered and each cradle in the group, which may number two hundred or more, is designated by a number. As an example, suppose bale No. 27523 is wanted and the index places this particular bale in tier A, cradle No. 1. Since the location of that particular cradle is, of course, known, there is no difficulty in going at once to it no matter how many bales may be in the particular group and such bale is at once accessible without the necessity of disturbing any other cage or cradle in the group.

By the system of storage and handling of cotton afforded by the present invention there is a saving of from thirty-five to forty per cent. of the operating expenses of a warehouse.

The present invention is designed primarily for the storage of baled cotton, but it is evident that the invention is readily adaptable to the storage of other commodities where it is desirable to have ready access to individual elements or groupings of such elements without any necessity of disturbing any other of the elements or groupings thereof.

What is claimed is:—

1. A means for storing commodities comprising receptacles with bottom and intermediate rollers thereon at the sides and with tracks positioned to receive the rollers of neighboring receptacles, the intermediate rollers projecting axially from the sides of the respective receptacles to reach and rest upon the intermediately located tracks of the receptacles at the sides of those carrying the rollers.

2. A storage means for bales of cotton comprising a group of receptacles each provided with supports individual thereto and in coactive relation to companion supports of neighboring receptacles, whereby each lower receptacle upholds the higher receptacles and is in turn sustained by those receptacles at the sides thereof and each receptacle is readily removable independently of the other receptacles.

3. A means for storing bales of cotton, comprising a group of receptacles arranged in upright tiers and longitudinal rows, with each receptacle provided with bottom and intermediate rollers at the sides and with top and intermediate tracks at the sides for the bottom and intermediate rollers of neighboring receptacles, whereby the receptacles are intersupporting and any receptacle may be drawn out from its normal position without disturbing any other receptacle.

4. A means for storing bales of cotton, comprising a group of receptacles arranged in upright tiers and longitudinal rows with each receptacle provided with bottom and intermediate rollers at the sides and with top and intermediate tracks at the sides for the bottom and intermediate rollers of neighboring receptacles, whereby the receptacles are intersupporting and any receptacle may be drawn out from its normal position without disturbing any other receptacle, said receptacles being provided with open tops and drop bottoms with means for normally holding the bottoms closed.

5. A means for storing bales of cotton comprising a group of receptacles arranged in upright and longitudinal rows with each receptacle provided with rollers at the lower edges, tracks at the upper edges for receiving the rollers of the next higher receptacles in order, and intermediately located rollers and tracks at the sides with the intermediately located rollers projecting from the sides of the receptacle to a distance to engage the intermediate tracks of the next receptacle at the side thereof, the intermediate tracks and rollers alternating in position one above the other in the alternate receptacles lengthwise of the rows.

6. A means for storing bales of cotton, comprising a group of receptacles arranged in upright and longitudinal rows with each receptacle provided with rollers at the lower edges, tracks at the upper edges for receiving the rollers of the next higher receptacles in order, and intermediately located rollers and tracks at the sides with the rollers projecting from the sides of the receptacle to a distance to engage the intermediate tracks of the next receptacle at the side thereof, the intermediate tracks and rollers alternating in position one above the other in the alternate receptacle lengthwise of the rows, each receptacle being provided with locking means for holding it in upright alinement with the other receptacles of the upright tier to which it belongs.

7. A storage means for bales of cotton, comprising receptacles arranged in upright tiers and longitudinal rows with each higher receptacle resting on and movable lengthwise of the next lower one and each receptacle provided with side supports individual and fast thereto and in interconnecting relation to companion supports on the next receptacles at the sides thereof, whereby the receptacles are interconnected and intersupporting, and any receptacle may be withdrawn from the group without interference with any other receptacle, each receptacle having one end accessible and provided at the other end with locking means for holding the receptacle in the retracted position, and said locking means being provided with manipulating means individual thereto and extended to the accessible end of the receptacle.

8. A storage means for bales of cotton comprising receptacles arranged in upright tiers and longitudinal rows with each higher receptacle resting on and movable lengthwise of the next lower one, and each receptacle provided with side supports in interconnecting relation to companion supports on the next receptacles at the sides thereof, whereby the receptacles are interconnected and intersupporting and any receptacle may be withdrawn from the group without interference with any other receptacle, each receptacle having one end accessible and provided at the other end with locking means for holding the receptacle in the retracted position, and said locking means being provided with manipulating means extended to the accessible end of the receptacle, each receptacle also being provided with a drop bottom portion and accessible latch means for holding said drop bottom in the elevated position and for releasing it at will.

9. A means for storing bales of cotton comprising upright tiers and longitudinal rows of receptacles of substantially rectangular shape with series of supporting rollers at the lower edges and longitudinal tracks at the upper edges with intermediate series of rollers of intermediate longitudinal tracks at the sides, supporting tracks for each tier, and an upright series of tracks at each end of the longitudinal rows of the group of receptacles.

10. A means for storing bales of cotton comprising upright tiers and longitudinal rows of receptacles of substantially rectangular shape with series of supporting rollers at the lower edges and longitudinal tracks at the upper edges with intermediate series of rollers of intermediate longitudinal tracks at the sides, supporting tracks for each tier, and an upright series of tracks at each end of the longitudinal rows of the group of receptacles, there also being provided abutting means for determining the retracted position of the receptacles and coacting locking means on the receptacles and abutting means for holding said receptacles in the retracted position.

11. A means for storing bales of cotton, comprising upright tiers and longitudinal rows of receptacles of substantially rectangular shape with series of supporting rollers at the lower edges and longitudinal tracks at the upper edges with intermediate series of rollers of intermediate longitudinal tracks at the sides, supporting tracks for each tier, and an upright series of tracks at each end of the longitudinal rows of the group of receptacles, there also being provided abutting means for determining the retracted position of the receptacles and coacting locking means on the receptacles and abutting means for holding said receptacles in the retracted position, and the receptacles being provided with drop bottom portions and latch means therefor.

12. In a means for storing cotton, a receptacle for one or more bales of cotton, comprising a skeleton frame of generally rectangular shape with a longitudinally disposed series of supporting rollers at each lower edge, a longitudinal track at each upper edge, and a longitudinal series of rollers and a longitudinal track intermediate of the first-named rollers and track on each side of the receptacle.

13. In a means for storing cotton, a group of receptacles each of a size to hold one or more bales of cotton and each comprising a frame of generally rectangular shape with longitudinally disposed supporting means on each side in coactive relation to like supporting means on the neighboring receptacles to support the receptacle when partially withdrawn from the group of which it forms a member, each receptacle being provided with a drop bottom and latch means for holding the bottom in the closed position, said drop bottom being pivoted to the receptacle on a line corresponding to the front edge of the group when the receptacle is partly withdrawn.

14. In a means for storing cotton, a receptacle for one or more bales of cotton, comprising a skeleton frame of generally rectangular shape with a longitudinally disposed series of supporting rollers at each lower edge, a longitudinal track at each upper edge, and a longitudinal series of rollers and a longitudinal track intermediate of the first-named rollers and track on each side of the receptacle, said receptacle being provided with a drop bottom with latch means for holding the bottom in the closed position, and the front lower edge of the receptacle being projected beyond the upright front plane of the receptacle to provide clearance for the bale of cotton when dropping from the receptacle.

15. In a means for storing bales of cotton, a receptacle of generally rectangular form of a size to contain one or more bales of cotton, said receptacle being open at the top and provided with a drop bottom consisting of a cross rod spaced from and nearer to one end of the receptacle than to the other end thereof and having pivot supports at the sides of the receptacle, and a central rod or bar extending from an intermediate part of the pivot rod to the front of the receptacle, and a latch for the central rod at the front of the receptacle for normally holding the rod in the elevated position and for releasing it, at will.

16. In a means for storing bales of cotton, a receptacle of generally rectangular form and of a size to contain a bale or bales of cotton, said receptacle having a drop bottom pivotally supported near the rear end of the receptacle, and said receptacle having an extension at the lower front edge providing clearance for a bale of cotton dropping from the receptacle.

17. In means for storing bales of cotton, a receptacle of generally rectangular form provided with an abutment member and a latch thereon at the rear end, and manipulating means extending from the latch to the front end of the receptacle about the marginal portion of the receptacle.

In testimony that I claim the foregoing as my own I have hereto affixed my signature in the presence of two witnesses.

ARTHUR LEE GREHAN.

Witnesses:
JOHN HENRY GREHAN,
BERTRAND ESTES MUNSON.

Copies of this patent may be obtained for five cents each, by addressing the "Commissioner of Patents, Washington, D. C."